US009758014B2

(12) United States Patent
Melbostad et al.

(10) Patent No.: US 9,758,014 B2
(45) Date of Patent: Sep. 12, 2017

(54) LOW PROFILE AIR CONDITIONING UNIT FOR VEHICLES

(75) Inventors: Steven Melbostad, North Branch, MN (US); Christopher J. Kroeker, Edina, MN (US); Lawrence P. Hong, Minneapolis, MN (US); Martin Duffy, Edina, MN (US)

(73) Assignee: THERMO KING CORPORATION, Minneapolis, MN (US)

( * ) Notice: Subject to any disclaimer, the term of this patent is extended or adjusted under 35 U.S.C. 154(b) by 2435 days.

(21) Appl. No.: 12/501,261

(22) Filed: Jul. 10, 2009

(65) Prior Publication Data

US 2010/0218530 A1 Sep. 2, 2010

Related U.S. Application Data

(63) Continuation-in-part of application No. 12/395,277, filed on Feb. 27, 2009.

(51) Int. Cl.
*B60H 1/32* (2006.01)
*B60H 1/00* (2006.01)

(52) U.S. Cl.
CPC ..... *B60H 1/00521* (2013.01); *B60H 1/00371* (2013.01); *B60H 1/00535* (2013.01); *B60H 2001/00235* (2013.01)

(58) Field of Classification Search
CPC ....... F25D 17/06; B60H 1/32; B60H 1/00371; B60H 1/00521; B60H 1/00535; B60H 2001/00235
USPC .............................. 62/239, 241, 244, 77, 298
See application file for complete search history.

(56) References Cited

U.S. PATENT DOCUMENTS

| 2,855,763 | A | | 10/1958 | Dean et al. | |
|---|---|---|---|---|---|
| 4,043,143 | A | * | 8/1977 | Fluder et al. | 62/243 |
| 4,201,064 | A | * | 5/1980 | Krug et al. | 62/239 |
| 4,641,502 | A | * | 2/1987 | Aldrich et al. | 62/244 |
| 4,672,818 | A | | 6/1987 | Roth | |
| 5,605,055 | A | | 2/1997 | Salgado | |
| 6,318,109 | B1 | | 11/2001 | Reimann et al. | |
| 6,339,934 | B1 | | 1/2002 | Yoon et al. | |

(Continued)

OTHER PUBLICATIONS

Thermo King Corporation, Rooftop Compact Unit Shuttle Athenia SR-250 / SR-350, TK 528974-3-PL (03-05) May 2005.

(Continued)

*Primary Examiner* — Frantz Jules
*Assistant Examiner* — Webeshet Mengesha
(74) *Attorney, Agent, or Firm* — Barnes & Thornburg LLP

(57) ABSTRACT

A vehicle including a roof that separates an exterior and an interior of the vehicle, and an air conditioning system. The roof has an exterior surface, an interior surface, and an aperture extending through the roof between the exterior surface and the interior surface. The air conditioning system includes an exterior housing that is mounted to the exterior surface of the roof and includes a divider defining a first cavity, and a second cavity. The air conditioning system also includes a condenser, an evaporator, and an evaporator blower. The air conditioning system further includes an interior housing that is removably mounted to the interior surface of the roof and defines a mounted position and a removed position in which the evaporator and evaporator blower are accessible for servicing from the interior of the vehicle.

23 Claims, 7 Drawing Sheets

(56) References Cited

U.S. PATENT DOCUMENTS

| | | |
|---|---|---|
| 6,564,574 B1 | 5/2003 | Pereira et al. |
| 6,763,669 B1 * | 7/2004 | Bushnell et al. ............... 62/115 |
| 6,915,651 B2 * | 7/2005 | Hille et al. ..................... 62/244 |
| 2002/0073723 A1 | 6/2002 | Hoos |
| 2004/0221599 A1 | 11/2004 | Hille et al. |
| 2005/0198985 A1 | 9/2005 | Allen et al. |
| 2007/0209385 A1 | 9/2007 | Yabu et al. |
| 2008/0148760 A1 | 6/2008 | Yanik et al. |
| 2008/0223060 A1 | 9/2008 | Chakiachvili et al. |

OTHER PUBLICATIONS

Konvekta Thermo Systems, KL 30 & KL 30T The synergy of experience and innovation, May 2005.

\* cited by examiner

LOW PROFILE AIR CONDITIONING UNIT FOR VEHICLES

RELATED APPLICATIONS

This patent application is a continuation-in-part of U.S. patent application Ser. No. 12/395,277 filed Feb. 27, 2009, the contents of which are hereby incorporated by reference in their entirety herein.

BACKGROUND

The present invention relates to roof mounted air conditioning units. Such units are often used on vehicles to maintain a desired temperature within the vehicle.

SUMMARY

Current roof-mounted air conditioning units for small passenger buses are generally too tall for industry needs and a low-profile unit is desired (e.g., less than 6 inches). Providing a low profile air conditioning unit is difficult due to the physical size of internal components (e.g., fans, coils), and the ability to provide enough open area around the condenser coil to allow for adequate airflow. A low-profile unit would be advantageous as it reduces the risk of the vehicle hitting overhanging objects (e.g., overhead doors, trees, canopies, etc.).

Assembly of roof-mounted air conditioning units typically involves numerous pieces and is labor intensive due to the complexities of a vapor compression cooling cycle (i.e., compressor, condenser, evaporator, throttling device). Typical problems with existing units include large variations in component location due to lack of self-locating features, excess open space within the unit, and variations induced by soldering operations. A simple assembly is desired by manufacturers to reduce assembly time and product defects.

Access to serviceable components inside the vehicle is desired over rooftop access. The return air opening is typically quite small, making it difficult to locate components therein without reducing system performance. Locating the serviceable components such that they are accessible from the interior provides a significant advantage because a technician may then service the unit comfortably without the use of a ladder.

Lightweight units are desired to increase vehicle weight and space capacity and to reduce fuel consumption. Heavy materials are typically used for the coils and other components due to higher than ambient pressures inherent to the system and robustness needed due to the transportation environment. The invention provides a lighter weight alternative.

In one construction, the invention includes a one-piece condenser and evaporator assembly that has a single cover that contains mounting features that enable the condenser coil, condenser fan, evaporator, and related plumbing to be installed inside of it. The mounting features allow for all components to be self-located to make assembly easier.

The invention includes a plenum which sits inside the bus. In some constructions, all frequently-serviceable components are located in the return air opening and plenum allowing for easy access from the inside of the vehicle.

In one embodiment, the invention provides a vehicle that includes a roof that separates an exterior of the vehicle and an interior of the vehicle, and an air conditioning system. The roof has an exterior surface, an interior surface, and an aperture extending through the roof between the exterior surface and the interior surface. The air conditioning system includes an exterior housing that is mounted to the exterior surface of the roof and includes a divider defining a first cavity on one side of the divider, and a second cavity on the other side of the divider and positioned over the aperture. The air conditioning system also includes a condenser that is at least partially disposed within the first cavity, an evaporator that is at least partially disposed within the second cavity, and an evaporator blower that is at least partially disposed within the second cavity. The air conditioning system further includes an interior housing that is removably mounted to the interior surface of the roof. The interior housing defines a mounted position in which the interior housing covers the aperture and a removed position in which the evaporator and evaporator blower are accessible through the aperture for servicing from the interior of the vehicle.

In another embodiment, the invention provides a vehicle that includes a roof separating an exterior of the vehicle and an interior of the vehicle and an air conditioning system. The roof defines an exterior surface, an interior surface, and an aperture extending through the roof between the exterior surface and the interior surface. The air conditioning system includes an exterior housing mounted to the exterior surface of the roof and positioned at least partially over the aperture, an interior housing removably mounted to the interior surface of the roof and positioned at least partially below the aperture, an evaporator mounted to the exterior housing, and an evaporator blower mounted to the exterior housing, wherein at least one of the evaporator and the evaporator blower is partially disposed within the exterior housing and extends through the aperture. The interior housing defines a mounted position in which the interior housing covers the aperture and a removed position in which the at least one of the evaporator and the evaporator blower is accessible through the aperture for servicing from the interior of the vehicle.

In another embodiment, the invention provides a vehicle that includes a roof separating an exterior of the vehicle and an interior of the vehicle and an air conditioning system. The roof defines an exterior surface, an interior surface, and an aperture extending through the roof between the exterior surface and the interior surface. The air conditioning system includes an exterior housing that includes a top and walls that extend generally downward from the perimeter of the top. The walls have lower edges that define a rim and at least a portion of the rim sealingly contacts the exterior surface of the roof. Additionally, the exterior housing is positioned at least partially over the aperture. The air conditioning system also includes an interior housing that includes a bottom and walls that extend generally upward from the perimeter of the bottom. The walls have upper edges that define a rim of the interior housing and the interior housing is movable between a mounted position in which the interior housing covers the aperture and a least a portion of the rim of the interior housing sealingly contacts the interior surface of the roof, and a removed position in which the aperture is accessible from the interior of the vehicle. The air conditioning system further includes a condenser and an evaporator fluidly connected in series. The condenser and the evaporator are each mounted to and at least partially disposed within at least one of the exterior housing and the interior housing.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
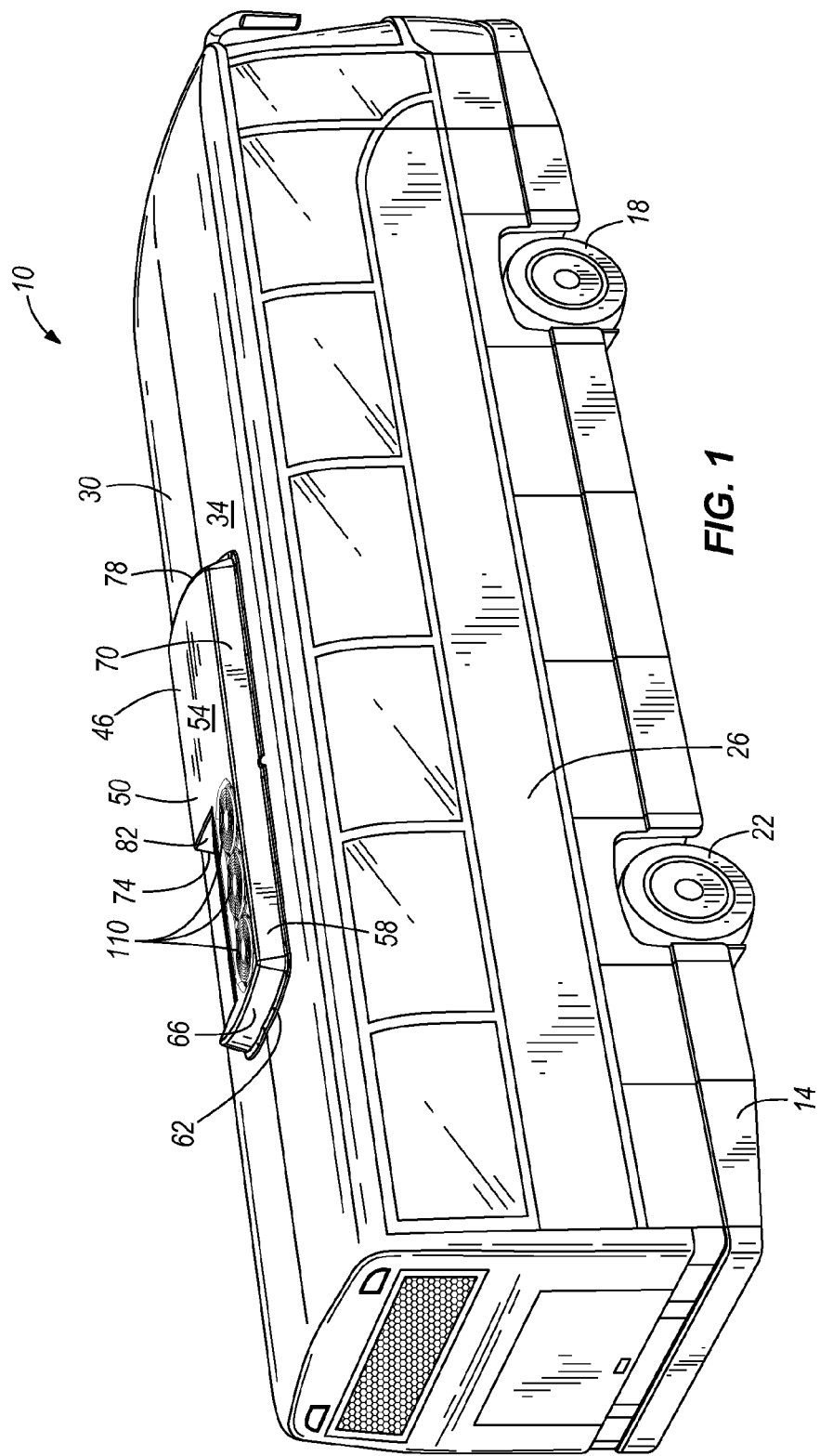
FIG. 1 is a perspective view of a vehicle in the form of a bus 10 that includes an air conditioning unit.

FIG. 1 shows a vehicle in the form of a small bus 10 that includes a frame 14, front wheels 18, rear wheels 22, an interior defined by four walls 26 and a roof 30, and a power train (not shown). The roof 30 defines an exterior surface 34 on the exterior of the bus 10 (see FIG. 2) and an interior surface 38 on the interior of the bus 10 (see FIG. 3). The roof 30 also includes an aperture 42 through the roof 30 from the exterior surface 34 to the interior surface 38. In the illustrated embodiment, the aperture 42 is a square shaped cutout. An air conditioning unit or A/C unit 46 is mounted to the roof 30 to condition the air in the interior of the bus 10.

Figure 2:
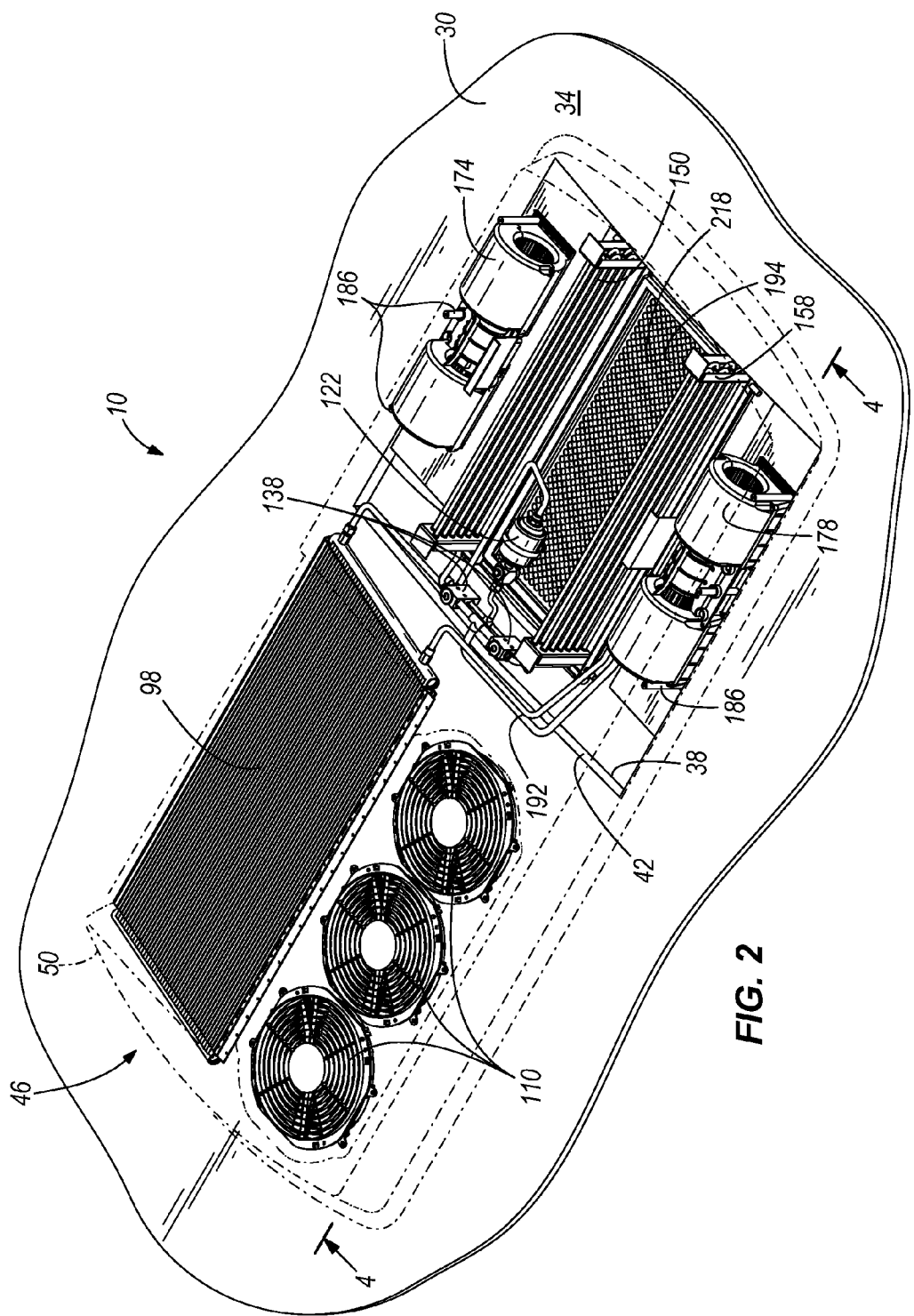
FIG. 2 is a partial perspective view of the bus 10 of FIG. 1 showing the air conditioning unit with an exterior housing shown in broken lines.

FIG. 2 shows the roof 30 and the A/C unit 46. The A/C unit 46 includes an exterior housing 50 that mounts to the exterior surface 34 of the roof 30. The illustrated exterior housing 50 is formed as a single piece out of plastic to provide a simply produced lightweight and aero-dynamic outer shell for the A/C unit 46. The exterior housing 50 includes a top 54 and walls 58 extending generally downwardly from the perimeter of the top 54. The walls 58 have lower edges that define a rim 62 that extends around the perimeter of the A/C unit 46 and at least partially seals against the exterior surface 34 of the roof 30. In the illustrated embodiment, the walls 58 are in the form of a rear wall 66, a first side wall 70, a second side wall 74, a sloped front wall 78, and a divider 82. In other embodiments, the exterior housing 50 could be produced from a different material (e.g., sheet metal), as desired.

The illustrated divider 82 is positioned between the rear wall 66 and the sloped front wall 78 and connects the first side wall 70 and the second side wall 74. In other embodiments the exterior housing 50 may be arranged differently, for example, the divider 82 may run perpendicular to the illustrated embodiment such that the rear wall 66 and the sloped front wall 78 are connected by the divider 82.

The rim 62 of the exterior housing 50 substantially seals to the exterior surface 34 of the roof 30 such that a first cavity 86 is defined by the area surrounded by the rear wall 66, a portion of the first side wall 70, a portion of the second side wall 74, the divider 82, and the exterior surface 34 of the roof 30. A second cavity 90 is defined by the area surrounded by the sloped front wall 78, a portion of the first side wall 70, a portion of the second side wall 74, the divider 82, and the exterior surface 34 of the roof 30. The second cavity 90 is positioned over the aperture 42 in the roof 30 such that the first cavity 86 is in communication with the bus 10 interior. The seal around the rim 62 inhibits communication between the bus 10 interior and the ambient outside air and/or the first cavity 86. The first cavity 86 is separate from the second cavity 90 and the seal formed around the rim 62 inhibits air flow and/or thermal transfer between the first cavity 86 and the second cavity 90.

The exterior housing 50 includes several self locating features that aid in component placement during assembly and add rigidity to the unit once installed. A condenser mount 94 positions and holds a condenser 98 within the first cavity 86 such that the condenser 98 is in thermal communication with the ambient air outside the bus 10. The condenser mount 94 includes features that hold at least a portion of the condenser 98 in place. In the illustrated embodiment, an extended tab 102 holds the condenser 98 in position and restricts movement in a side to side direction. To install the condenser 98, an installer simply snaps the condenser 98 into place and secures it with fasteners (not shown). The condenser mount 94 substantially reduces the number of fasteners necessary, makes the installation easier, and produces repeatable positioning for the installer.

Three condenser fan mounts 106 position and hold three condenser fans 110 within the first cavity 86 such that the condenser fans 110 direct ambient air through the first cavity 86 and through the condenser 98 to aid in thermal transfer. Each condenser fan mount 106 includes several tabs 114 that engage portions of the condenser fans 110. The tabs 114 act to align the condenser fans 110 while the installer installs fasteners (not shown) to secure the position. In other embodiments, more than three or less than three condenser fans 110 may be employed.

A dryer mount 126 positions and holds a dryer 122 within the second cavity 90. The dryer mount 126 includes a clamp 130 that engages the dryer mount 126 and the dryer 122 to hold the dryer 122 in the desired position.

An expansion mount 134 positions and holds an expansion device 138 within the second cavity 90. The expansion mount 134 includes several tabs 142 that position the expansion device 138 while the installer installs fasteners (not shown) to maintain the desired position.

A first evaporator mount 146 positions and holds a first evaporator 150 within the second cavity 90 and a second evaporator mount 154 positions and holds a second evaporator 158 within the second cavity 90. The first and second evaporator mounts 146, 154 include vertical ribs 162 that locate the first and second evaporators 150, 158 within the second cavity 90 and position the first and second evaporators 150, 158 in the front to back direction. Fasteners (not shown) are installed to maintain the first and second evaporators 150, 158 in the desired positions. The vertical ribs 162 also act as dividers to divert the majority of the airflow through the first and second evaporators 150, 158 such that air cannot flow around within being conditioned.

A first evaporator blower mount 166 and a second evaporator blower mount 170 position and hold a first evaporator blower 174 and a second evaporator blower 178, respectively, within the second cavity 90. The first and second evaporator blower mounts 166, 170 include tabs with apertures 182 formed in the side of the exterior housing 50. The evaporator blowers 174, 178 include protrusions 186 that engage the tabs with apertures 182 to position and partially hold the first and second evaporator blowers 174, 178 in the desired position. Fasteners (not shown) are then used to secure the first and second evaporator blowers 174, 178 in the desired position.

Tube mounts 190 may be positioned throughout the exterior housing 50 to hold refrigerant tubes 192 in position. In the illustrated embodiment, no fasteners are used to hold the tubes 192 in place. In other embodiments, several tube mounts 190 may be placed throughout the A/C unit 46.

The condenser mount 94, the condenser fan mounts 106, the dryer mount 126, the expansion mount 134, the first and second evaporator mounts 146, 154, the first and second evaporator blower mounts 166, 170, and the tube mounts 190 are all formed as a single piece with the exterior housing 50. This arrangement provides the manufacturer, installer, and service person with easy and repeatable quality regarding position and speed of component placement. It also reduces time and space within the exterior housing 50 because the components can be more easily installed and manipulated.

The mounts themselves can be in a different form than illustrated. For example, different shaped tabs, different fasteners, apertures, protrusions, or other locating features may be used. The shape and arrangement of the illustrated locating features should not be limiting to the invention.

A refrigerant compressor (not shown) is located in the engine housing of the bus 10 and is in communication with the refrigerant tubes 192. In the illustrated embodiment, the compressor is a remotely located mechanically driven compressor that is driven by the bus engine. In other embodiments, the A/C unit 46 may be all electric and may utilize an electric compressor mounted to the exterior housing or in another location.

Figure 3:
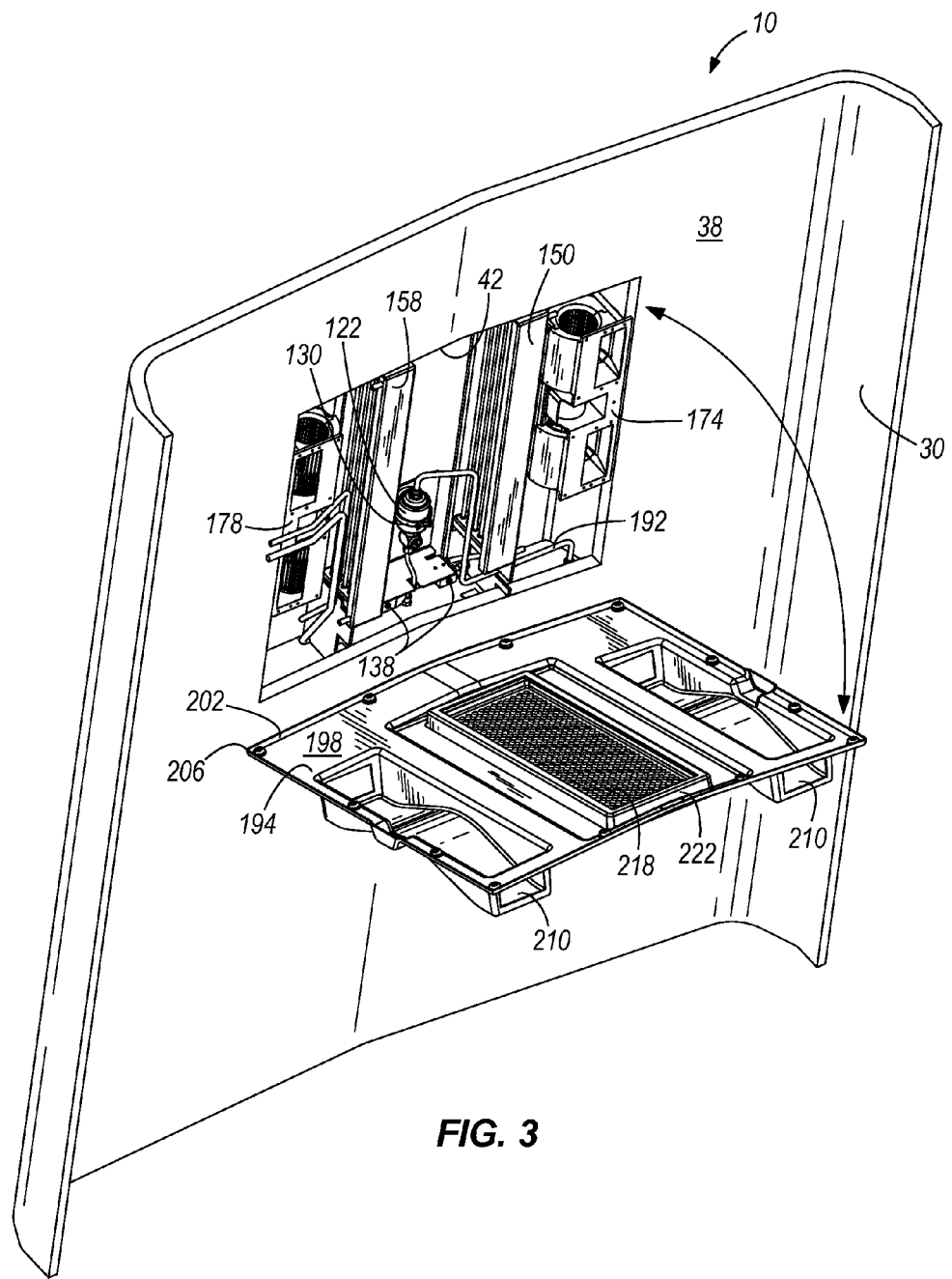
FIG. 3 is a partial perspective view of the inside of the bus 10 of FIG. 1 showing the air conditioning unit with an interior housing in the removed position.

With reference to FIG. 3, it is shown that the dryer 122, expansion device 138, first and second evaporators 150, 158, and first and second evaporator blowers 174, 178 are positioned such that they are substantially aligned with the aperture 42 in the roof 30. The compressor (not shown), the condenser 98, the dryer 122, the expansion device 138, and the first and second evaporators 150, 158 are fluidly connected in series to define a refrigeration circuit that is operable to provide cooled air to the interior of the bus 10.

The first and second evaporators 150, 158 are mounted to the exterior housing 50 and extend below the exterior surface 34 of the roof 30 and at least partially through the aperture 42 (i.e., between the exterior surface 34 and the interior surface 38). Likewise, the first and second evaporator blowers 174, 178 are mounted to the exterior housing 50 and extend below the exterior surface 34 of the roof 30 and at least partially through the aperture 42 (i.e., between the exterior surface 34 and the interior surface 38). This extension through the aperture 42 allows the height of the A/C unit 46 above the exterior surface 34 of the roof 30 to be substantially reduced while maintaining a desirable arrangement for airflow through the first and second evaporators.

In another embodiment, the first and second evaporators 150, 158 are mounted to the exterior housing 50 and extend below the exterior surface 34 of the roof 30, through the aperture 42, and at least partially below the interior surface 38 of the roof 30. Likewise, the first and second evaporator blowers 174, 178 are mounted to the exterior housing 50 and extend below the exterior surface 34 of the roof 30, through the aperture 42, and at least partially below the interior surface 38 of the roof 30.

Such an arrangement also provides the advantage that all the serviceable components (e.g., the dryer 122, expansion device 138, first and second evaporators 150, 158, first and second evaporator blowers 174, 178, etc.) are accessible from the interior of the bus 10 through the aperture 42. Accessing serviceable components from the interior of the bus 10 provides a significant advantage for service people and installers who do not need a ladder for access making installation and servicing substantially faster and easier.

FIG. 3 also shows an interior housing 194 that includes a bottom 198 and walls 202 extending generally upwardly from the perimeter of the bottom 198. The walls 202 have upper edges that define a rim 206 of the interior housing 194. The interior housing 194 also includes vents 210 provided with conditioned air from the first and second evaporator blowers 174, 178, and a return air vent 214. The return air vent 214 includes an air filtration system 218 for at least partially cleaning the air before it is supplied to the first and second evaporators 150, 158 to maintain desirable atmospheric conditions within the bus 10. The arrangement of the first and second evaporator blowers 174, 178 allows for minimal intrusion of the vents 210 into the interior of the bus 10. In the illustrated embodiment, the vents 210 extend into the bus 10 about four inches below the interior surface 38 of the roof 30. In another embodiment, the vents 210 extend into the bus 10 less than about six inches below the interior surface 38 of the roof 30. In another embodiment, the first and second evaporator blowers 174, 178 may be mounted to the interior housing 194 with locating features or fasteners, as desired.

The illustrated interior housing 194 is removably mounted to the interior surface 38 of the roof 30 and defines a mounted position (see FIG. 3) in which the interior housing 194 covers the aperture 42 and a least a portion of the rim 206 of the interior housing 194 sealingly contacts the interior surface 38 of the roof 30, and a removed position (see FIG. 4) in which the serviceable components are accessible through the aperture 42 for servicing from the interior of the bus 10. The illustrated interior housing 194 is mounted to the interior surface 38 of the roof 30 with fasteners (not shown). In other embodiments, a hinge may be installed and a detent mechanism used to hold the interior housing 194 in place. In addition, the interior housing 194 may mount directly to the exterior housing 50, or may not be substantially sealed to the interior surface of the roof. The way in which the interior housing 194 is mounted to the interior surface 38 of the roof 30 should not be limiting except in the fact that the interior housing 194 is removable such that the serviceable components may be accessed from the interior of the bus 10.

The interior housing 194 is preferably formed in a single operation as a single piece out of plastic. The interior housing 194 includes mounting features that self align with the first and second evaporators 150, 158 and first and second evaporator blowers 174, 178. Additionally, the interior housing 194 includes mounting features 222 for the air filtration system 218 to aid in the assembly and maintenance of the air filtration system 218. In other embodiments, the interior housing 194 could be produced from a different material (e.g., sheet metal).

Figure 4:
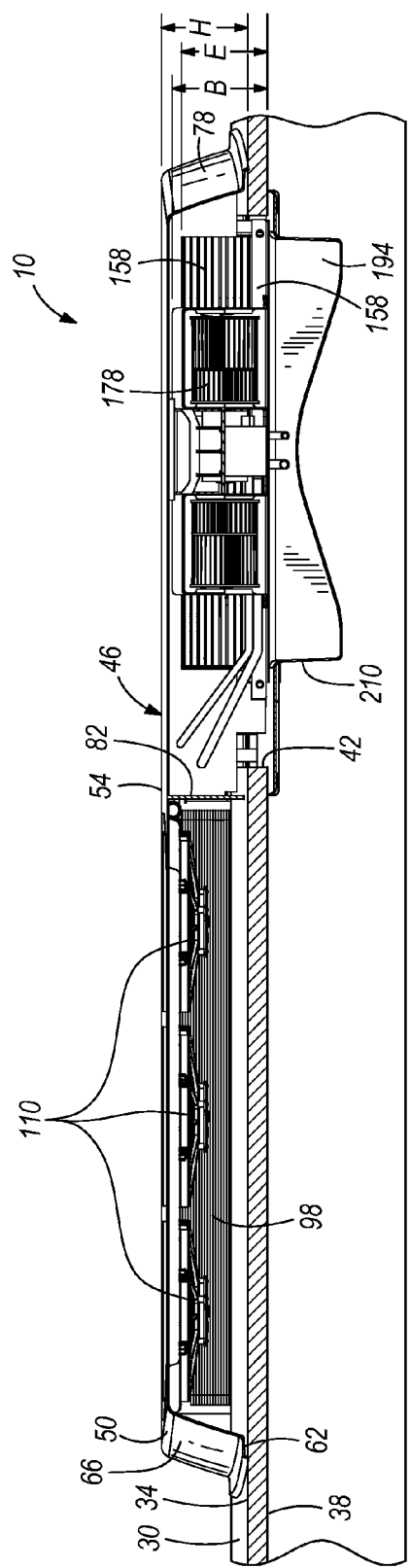
FIG. 4 is a partial sectional view of the bus 10 of FIG. 1 showing the air conditioning unit taken along line 4-4 in FIG. 2.
Figure 5:
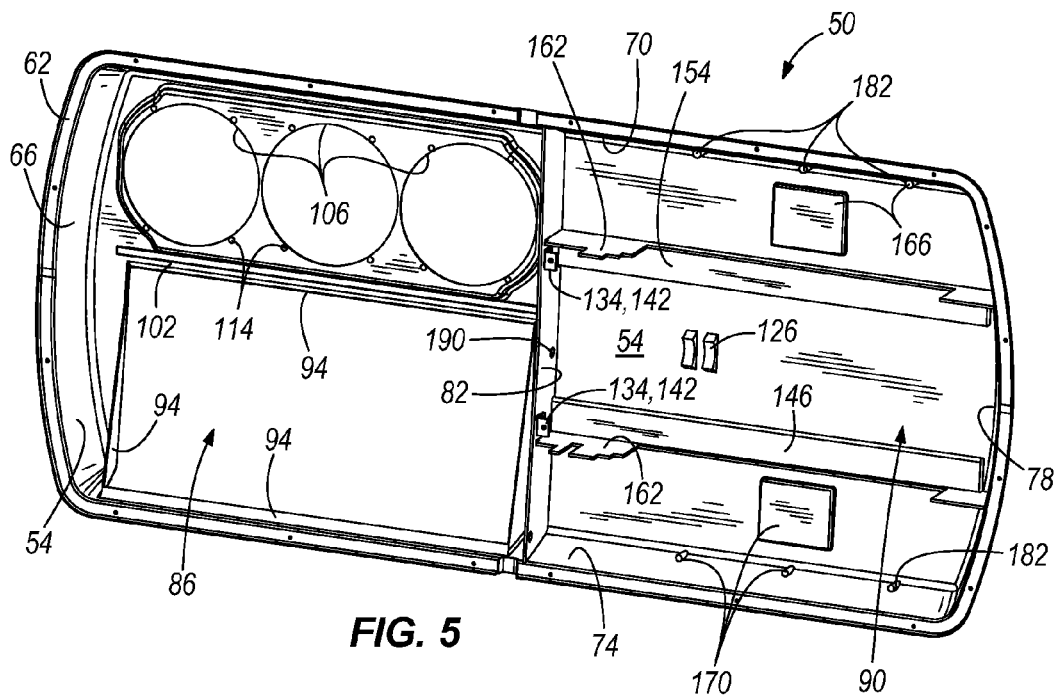
FIG. 5 is a bottom view of the exterior housing of FIG. 2.
Figure 6:
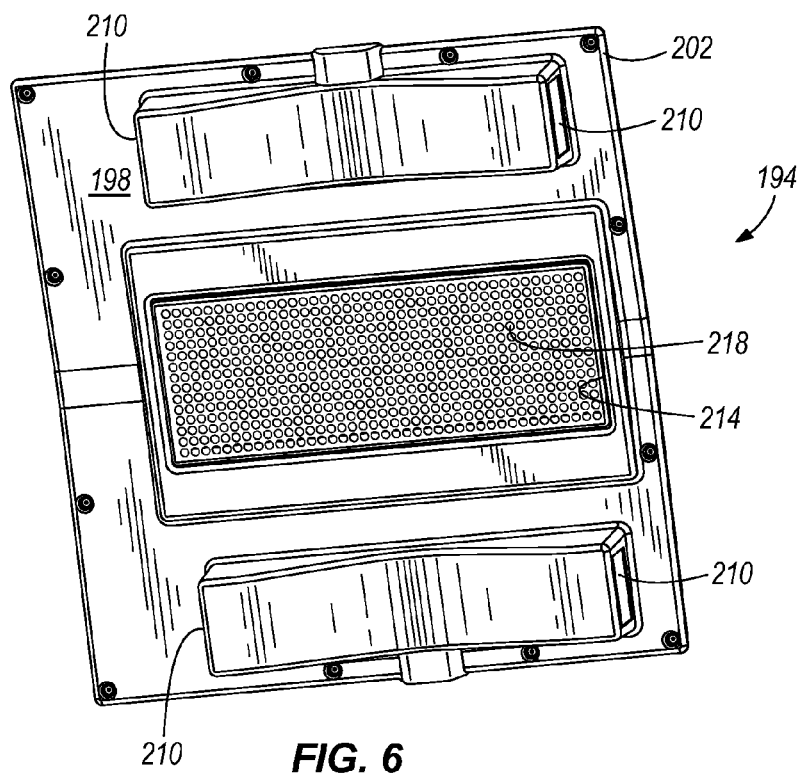
FIG. 6 is a bottom view of the interior housing of FIG. 3.

FIG. 4 shows an elevation view of the A/C unit 46 installed on the bus 10. The exterior housing 50 defines an exterior height H above the exterior surface 34 of the roof 30. It is desired that the exterior height H be as small as possible to reduce the risk of hitting overhanging objects and to provide other advantages. In the illustrated embodiment, the exterior height H is about five inches. In other embodiments, the exterior height H is less than about six inches. In still other embodiments, the exterior height H is less than about eight inches.

The first and second evaporators 150, 158 define an evaporator height E. In the illustrated embodiment, the evaporator height E is greater than the exterior height H such that the first and second evaporators 150, 158 are mounted to the top 54 of the exterior housing 50 and extend below the exterior surface 34 of the roof 30. In the illustrated embodiment, the evaporator height E is about six inches. In other embodiments, the evaporator height E is less than about seven inches. In still other embodiments, the evaporator height E is less than about ten inches.

The first and second evaporator blowers 174, 178 define an evaporator blower height B. In the illustrated embodiment, the evaporator blower height B is greater than the exterior height H such that the first and second evaporator blowers 174, 178 are mounted to the top 54 of the exterior housing 50 and extend below the exterior surface 34 of the roof 30. In the illustrated embodiment, the evaporator blower height B is about seven inches. In other embodiments, the evaporator blower height B is less than about six inches. In still other embodiments, the evaporator blower height B is less than about ten inches.

In the illustrated embodiment, the exterior housing 50 and the interior housing 194 sandwich the roof 30 with the exterior housing 50 substantially sealing against the exterior surface 34 of the roof 30 and the interior housing 194 substantially sealing against the interior surface 38 of the roof 30. The A/C unit 46 does not include any support surface or other features for supporting any of the dryer 122, the condenser 98, and the evaporators 150, 158 separate from the exterior housing 50 between the exterior housing 50 and the exterior surface 34. In the illustrated embodiment, the dryer 122, the two evaporators 150, 158, the two evaporator blowers 174, 178, the expansion device 138, the condenser 98, and the condenser fans 110, are supported only by their respective mounts and no other features are necessary for support.

The compressor (not shown) provides a compressed refrigerant to the condenser 98 wherein heat is exchanged between the refrigerant and the ambient air. The condenser fans 110 draw ambient air across and through the condenser 98 to aid in the thermal transfer. The refrigerant is then supplied to the dryer 122 before passing to the expansion device 138 where the pressure of the fluid is reduced. The lower pressure refrigerant is then provided to the first and second evaporators 150, 158 to exchange heat with the air within the interior of the bus 10. The first and second evaporator blowers 174, 178 draw interior air across the evaporators 150, 158 to aid in the cooling of the interior air. The specific design of the components of the A/C unit 46 is not limiting on the scope of the invention. Other components may be used, as desired, such as valves, filters, economizers, or other components known in the industry.

The illustrated embodiment includes two evaporators 150, 158 and two evaporator blowers 174, 178. However, other embodiments include only a single evaporator and a single evaporator blower. In still other embodiments, the evaporator blower could be eliminated. Additionally, the arrangement of the components within the exterior housing 50 could be different, as desired, such as the position and alignment of the evaporator, blower, or any other component.

Another advantage provided by the invention is the use of lightweight materials. The illustrated condenser 98, the first evaporator 150, and the second evaporator 158 are at least partially formed from aluminum. The refrigerant tubes 192 are formed from aluminum and are connected to the various components without the use of brazing. Again, the aluminum is lower in weight than traditional materials and the lack of brazing operations aids in the ease and speed of assembly and maintenance. Another weight savings is observed by the inventions ability to utilize the exterior surface 34 of the roof 30 as the lower boundary of the first cavity 86 and the interior housing 194 provides the lower boundary for the second cavity 90. This allows the A/C unit 46 to remove material typical of such units. The weight reduction observed by the invention provides a worthwhile savings related to fuel economy and increases the marketability of the A/C unit 46. Typical units that would be comparable with the cooling capacity of the illustrated embodiment of the invention weigh about one hundred seventy pounds, whereas the illustrated A/C unit 46 weighs about one hundred pounds. In other embodiments, the A/C unit 46 weighs less than about one hundred twenty pounds. In still other embodiments, the A/C unit 46 weighs less than about one hundred forty pounds. While the illustrated materials were chosen for their weight saving characteristics, in other embodiments, other materials may be used (e.g., copper), as desired.

Figure 7:
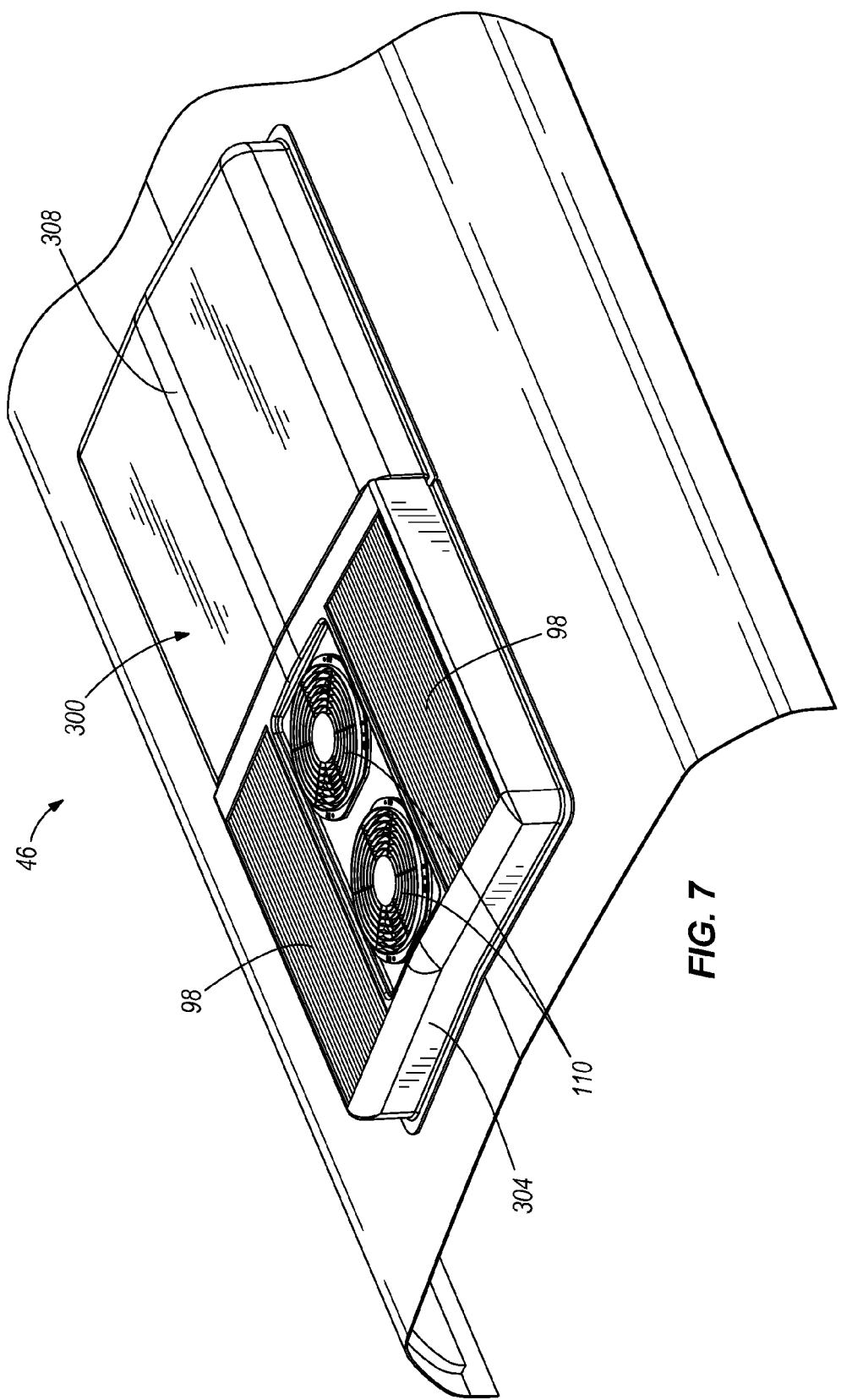
FIG. 7 is a perspective view of another air conditioning unit.
Figure 8:
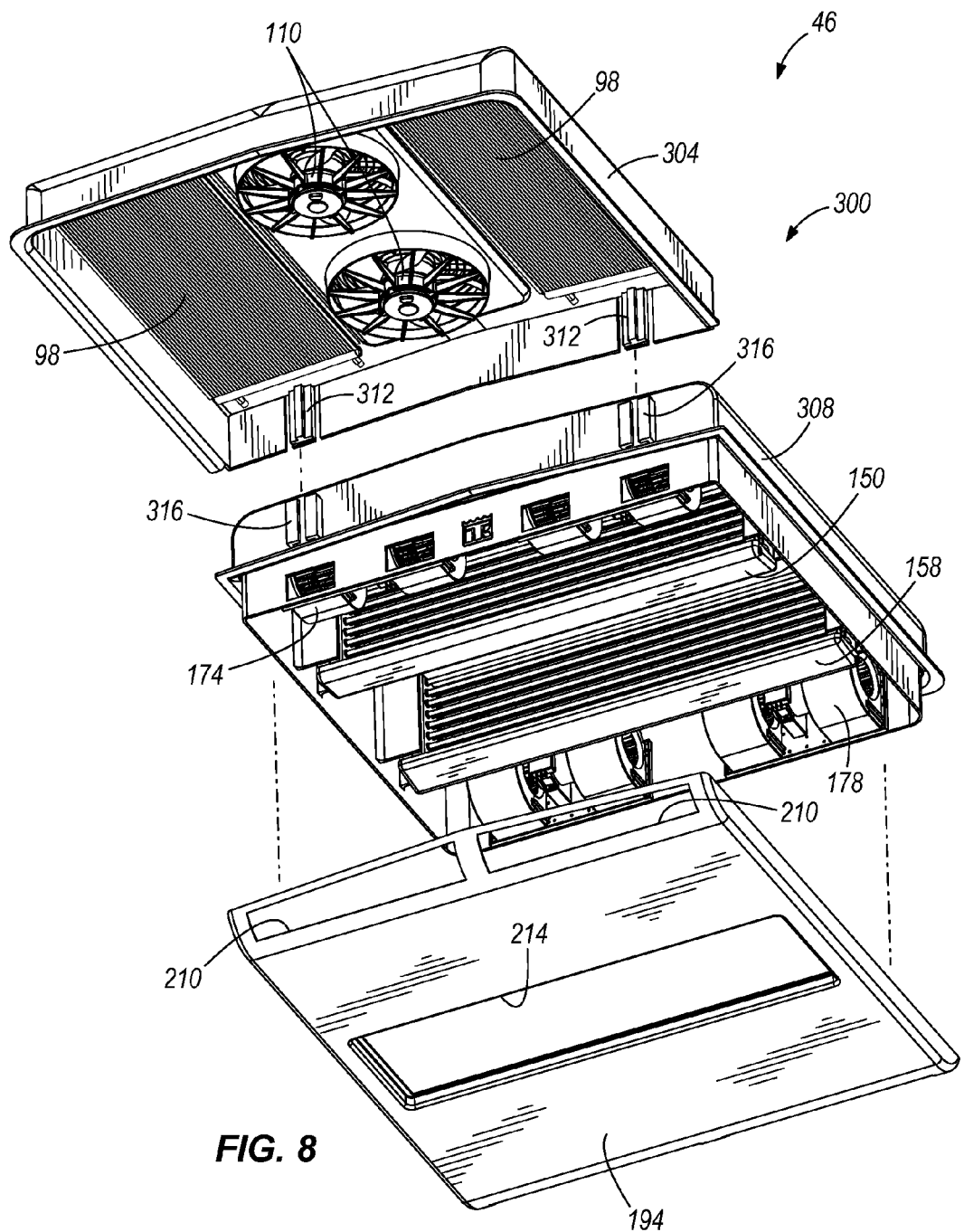
FIG. 8 is an exploded view of the air conditioning unit of FIG. 7.

In another embodiment, shown in FIGS. 7 and 8, the A/C unit 46 includes a two-piece housing 300 and the components of the A/C unit 46 are rearranged. The illustrated two-piece housing 300 includes a first housing 304 and a second housing 308. The first housing 304 supports the condenser fans 110 and a pair of condensers 98. The condenser fans 110 are centrally located and the condensers 98 flank the condenser fans 110. The first housing 304 also includes tabs 312 that extend substantially the full height of the first housing 304 proximate a front wall of the first housing 304. Other components may be positioned within the first housing 304, as desired.

The second housing 308 supports the dryer 122 (not visible), expansion device 138 (not visible), first and second evaporators 150, 158, and first and second evaporator blowers 174, 178. Other components may be positioned within the second housing 308, as desired. As shown in FIG. 8, the first and second evaporators 150, 158 are positioned such that they extend transverse to the length of the bus 10 and the first and second evaporator blowers 174, 178 include 4 "squirrel cage" blowers. Other changes may be made to the arrangement of the A/C unit 46, as desired. The second housing 308 also includes slots 316 shaped to receive the tabs 312 of the first housing 304. The slots 316 and tabs 312 provide an alignment feature to aid in the assembly and maintenance of the housing 300 and A/C unit 46.

The interior housing 194 is arranged to match the A/C unit 46 such that the vents 210 align with the first and second evaporator blowers 174, 178 and the return air vent 214 aligns in between the first and second evaporators 150, 154.

Various features and advantages of the invention are set forth in the following claims.

What is claimed is:

1. A vehicle comprising:
    a roof separating an exterior of the vehicle and an interior of the vehicle, the roof having an exterior surface, an interior surface, and an aperture extending through the roof between the exterior surface and the interior surface; and
    an air conditioning system including:
        an exterior housing mounted to the exterior surface of the roof and including
            a divider defining a first cavity on one side of the divider, and a second cavity on another side of the divider, the second cavity positioned over the aperture,
            a condenser mount within the first cavity, and an evaporator mount within the second cavity;
a condenser mounted within the first cavity to the condenser mount such that the condenser is disposed above the exterior surface of the roof;
an evaporator mounted to the evaporator mount and at least partially disposed within the second cavity;
an evaporator blower at least partially disposed within the second cavity; and
an interior housing removably mounted to the interior surface of the roof defining a mounted position in which the interior housing covers the aperture and a removed position in which the evaporator and evaporator blower are accessible through the aperture for servicing from the interior of the vehicle.

2. The vehicle of claim 1, further comprising a dryer mounted to the exterior housing within the second cavity.

3. The vehicle of claim 2, wherein the evaporator is mounted within the second cavity to the evaporator mount such that at least a portion of the evaporator extends through the aperture below the exterior surface of the roof.

4. The vehicle of claim 3, wherein the exterior housing includes an evaporator blower mount within the second cavity positioned above the aperture, and wherein the evaporator blower is mounted within the second cavity to the evaporator blower mount such that at least a portion of the evaporator blower extends through the aperture below the exterior surface of the roof.

5. The vehicle of claim 4, wherein the interior housing encases the portion of the evaporator and the portion of the evaporator blower disposed below the exterior surface of the roof, and wherein when the interior housing is in the removed position the evaporator and evaporator blower are accessible through the aperture for servicing from the interior of the vehicle.

6. The vehicle of claim 5, wherein the exterior housing includes a condenser fan mount within the first cavity, and wherein the air conditioning system includes a condenser fan mounted to the condenser fan mount and disposed at least partially within the first cavity.

7. The vehicle of claim 5, wherein the exterior housing is a plastic molding and the divider, the condenser mount, the evaporator mount, and the evaporator blower mount are formed as a single piece with the exterior housing.

8. The vehicle of claim 5, wherein the total height of the air conditioning system above the exterior surface of the roof is less than five inches.

9. The vehicle of claim 7, wherein the total height of the air conditioning system above the exterior surface of the roof is less than eight inches.

10. The vehicle of claim 1, wherein the exterior housing includes a first housing defining the first cavity and a second housing defining the second cavity.

11. A vehicle comprising:
a roof separating an exterior of the vehicle and an interior of the vehicle, the roof defining an exterior surface, an interior surface, and an aperture extending through the roof between the exterior surface and the interior surface; and
an air conditioning system including:
an exterior housing mounted to the exterior surface of the roof and positioned at least partially over the aperture,
an interior housing removably mounted to the interior surface of the roof and positioned at least partially below the aperture,
an evaporator mounted to the exterior housing, and
an evaporator blower mounted to the exterior housing, wherein at least one of the evaporator and the evaporator blower is partially disposed within the exterior housing and extends through the aperture,
wherein the interior housing defines a mounted position in which the interior housing covers the aperture and a removed position in which the at least one of the evaporator and the evaporator blower is accessible through the aperture for servicing from the interior of the vehicle.

12. The vehicle of claim 11, wherein the at least one of the evaporator and the evaporator blower is partially disposed within the interior housing.

13. The vehicle of claim 11, wherein the interior housing includes vents in communication with the evaporator blowers to supply a flow of temperature conditioned air to the interior of the vehicle, and wherein the interior housing includes an air filter.

14. The vehicle of claim 11, wherein the total height of the air conditioning system above the exterior surface of the roof is less than five inches.

15. The vehicle of claim 11, wherein the total height of the air conditioning system above the exterior surface of the roof is less than eight inches.

16. The vehicle of claim 11, wherein the exterior housing includes a first housing, and a second housing positioned over the aperture, the evaporator mounted to the second housing.

17. A vehicle comprising:
a roof separating an exterior of the vehicle and an interior of the vehicle, the roof defining an exterior surface, an interior surface, and an aperture extending through the roof between the exterior surface and the interior surface; and
an air conditioning system including:
an exterior housing including a top and walls extending generally downwardly from the perimeter of the top, the walls having lower edges defining a rim, at least a portion of the rim sealingly contacting the exterior surface of the roof, the exterior housing positioned at least partially over the aperture,
an interior housing including a bottom and walls extending generally upwardly from the perimeter of the bottom, the walls having upper edges defining a rim of the interior housing, the interior housing movable between a mounted position in which the interior housing covers the aperture and a least a portion of the rim of the interior housing sealingly contacts the interior surface of the roof, and a removed position in which the aperture is accessible from the interior of the vehicle, and
a condenser and an evaporator fluidly connected in series, wherein the condenser, and the evaporator are each mounted to and at least partially disposed within at least one of the exterior housing and the interior housing.

18. The vehicle of claim 17, wherein the exterior housing is mounted to the exterior surface of the roof and the interior housing is mounted to the interior surface of the roof.

19. The vehicle of claim 18, wherein at least a portion of the evaporator extends into the aperture.

20. The vehicle of claim 18, wherein the exterior housing and the interior housing sandwich the roof, and wherein the air conditioning system does not include any support surface for supporting any of the condenser and the evaporator separate from the exterior housing between the exterior housing and the exterior surface.

21. The vehicle of claim 17, wherein the total height of the air conditioning system above the exterior surface of the roof is less than five inches.

22. The vehicle of claim 17, wherein the total height of the air conditioning system above the exterior surface of the roof is less than eight inches.

23. The vehicle of claim 17, wherein the exterior housing includes a first housing, and a second housing positioned over the aperture, the condenser mounted to the first housing and the evaporator mounted to the second housing.

\* \* \* \* \*